(12) United States Patent
DeVale et al.

(10) Patent No.: US 7,418,551 B2
(45) Date of Patent: Aug. 26, 2008

(54) MULTI-PURPOSE REGISTER CACHE

(75) Inventors: John P. DeVale, Austin, TX (US);
Bryan P. Black, Austin, TX (US);
Edward A. Brekelbaum, Pflugerville,
TX (US); Jeffrey P. Rupley, II, Round
Rock, TX (US)

(73) Assignee: Intel Corporation, Santa Clara, CA (US)

( * ) Notice: Subject to any disclaimer, the term of this patent is extended or adjusted under 35 U.S.C. 154(b) by 574 days.

(21) Appl. No.: 10/886,402

(22) Filed: Jul. 6, 2004

(65) Prior Publication Data

US 2006/0010292 A1 Jan. 12, 2006

(51) Int. Cl.
*G06F 12/00* (2006.01)

(52) U.S. Cl. .................................................... 711/118
(58) Field of Classification Search ............... None
See application file for complete search history.

(56) References Cited

U.S. PATENT DOCUMENTS

2002/0066083 A1 * 5/2002 Patel et al. ................. 717/136
2005/0138297 A1 * 6/2005 Sodani et al. .............. 711/143

* cited by examiner

*Primary Examiner*—Hiep T Nguyen
(74) *Attorney, Agent, or Firm*—Erik M. Metzger

(57) ABSTRACT

A technique to use available register cache resources if register file resources are unavailable. Embodiments of the invention pertain to a register cache writeback algorithm for storing writeback data to a register cache if register file write ports or space is unavailable.

25 Claims, 8 Drawing Sheets

MULTI-PURPOSE REGISTER CACHE

BACKGROUND OF THE INVENTION

Some embodiments of the present invention are generally related to microprocessors, and more particularly, to register files.

A register system is a key component of a microprocessor. The register system should be responsive and able to deliver data quickly, yet be large enough to support a high level of instruction level parallelism (ILP).

Register file accesses can often require multiple cycles of latency, because of the manner in which they are addressed. Typically, register files are accessed through address decoding logic, or "ports", that can be costly in terms of die area and power consumption. Furthermore, microprocessor designers may include additional storage structures in a microprocessor datapath, such as a register cache, which can typically be accessed faster than the register file, due to its size. Accordingly, data storage structures, such as, register caches, can be used to supplement the storage space and performance needs of some prior art microprocessor architectures.

Because data writes can also require multiple processor cycles to complete, data to be written to the register file is often stored in a memory buffer, known as a writeback queue, after they have been issued from the processor core logic. Accordingly, data can be temporarily stored in the writeback queue until it can be stored in the register file (assuming a deep enough queue).

Similarly, some prior art datapaths can use a bypass cache temporarily before the data is returned to the processing functional elements. Bypass cache and associated logic can be used in prior art processor datapaths for data that is to be immediately reused by subsequent operations after being generated by the processor core logic, instead of, or in addition to, storing this data in the register file. Typically, bypass caches return data to the functional units of a processor, such as the execution units, directly, whereas writeback queues return data to the register file of the datapath, which can be accessed by the functional units.

FIG. 1 illustrates a portion of a prior art processor datapath in which a micro-operation (uop) windowing mechanism ("non-data capture window") provides uops to the processor core logic functional units for execution. The executed uops may access data via a register file and register cache structure. Specifically, data to be used by uops executed by the functional units is stored in the register file, to the extent bandwidth and space are available, and then to the reservation station for use by the functional units. Alternatively, data can be accessed from the register cache if it is available there, which is typically faster than accessing the data from the register file.

Data stored in the register cache can be accessed by the functional units directly. Typically, the register cache contains a copy of the data stored in the register file.

Data returned by the functional units to the register file may be temporarily stored in the writeback queue or bypass cache until the data is needed by the functional units (in the case of a bypass cache) or until bandwidth/space is available in the register file (in the case of the writeback queue). If space or bandwidth is not available in the register file, the processor will stall until the register file is available, thereby incurring processor performance penalties.

Bypass caches and writeback queues can be costly in terms of die area and power consumption, however. Furthermore, as microprocessors increase in operand size and speed, so does the demand on the register file. In order to keep up with the demand of processor performance, register files and/or their associated register caches must expand, thereby incurring power and die area penalties. Accordingly, designers are often faced with having to sacrifice power and die area for more register file performance.

BRIEF DESCRIPTION OF THE DRAWINGS

The invention shall be described with reference to the accompanying figures, wherein.

DETAILED DESCRIPTION OF PREFERRED EMBODIMENTS

Figure 1:
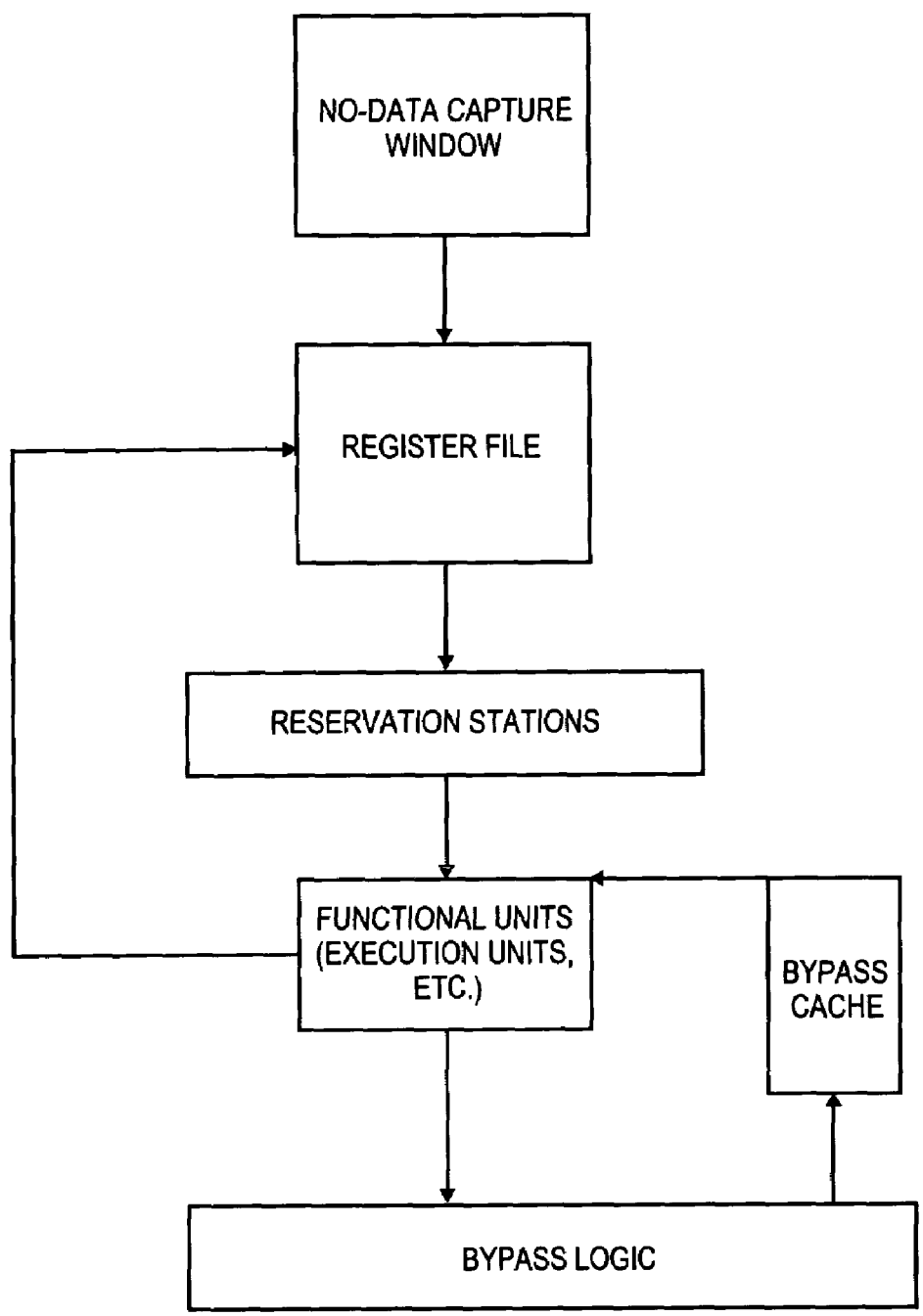
FIG. 1 illustrates a prior art a register file system.

While the present invention is described in terms of the examples below, this is for convenience only and is not intended to limit its application. In fact, after reading the following description, it will be apparent to one of ordinary skill in the art how to implement the following invention in alternative embodiments (e.g., in systems employing in-order processing, out-of-order processing, etc.).

In this detailed description, numerous specific details are set forth. However, it is understood that embodiments of the invention may be practiced without these specific details. In other instances, well-known circuits, structures, and/or techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In this detailed description and claims, the term "coupled," along with its derivatives, such as, "connected" and "electrically connected", may be used. It should be understood that "coupled" may mean that two or more elements are in direct physical or electrical contact with each other or that the two or more elements are not in direct contact but still cooperate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Embodiments of the present invention may provide improved processing performance while reducing, or at least substantially maintaining, power consumption and die area requirements of the prior art. Specifically, some embodiments of the invention make use of a register cache to store data until adequate register file bandwidth is available. Register file bandwidth can be constrained by the number of available address decoding pathways, or "ports", as well as by the available space in the register file at any given time. By allowing data returned from processor core logic functional units, such as the execution units, to be stored temporarily in the register cache until appropriate register file bandwidth is available, embodiments of the present invention make more efficient use of available datapath storage space than the prior art.

Furthermore, in some embodiments of the invention, data from the processor core logic functional units can be stored in the register cache in lieu of being stored in the register file. This situation can exist, for example, if the data is invalidated before the data has been written to the register file. As in prior art implementations, the register cache can be used to store data used by uops issued from the non-data capture window, as well as provide data to the processor core logic functional units directly rather than storing them first in the register file.

Figure 2:
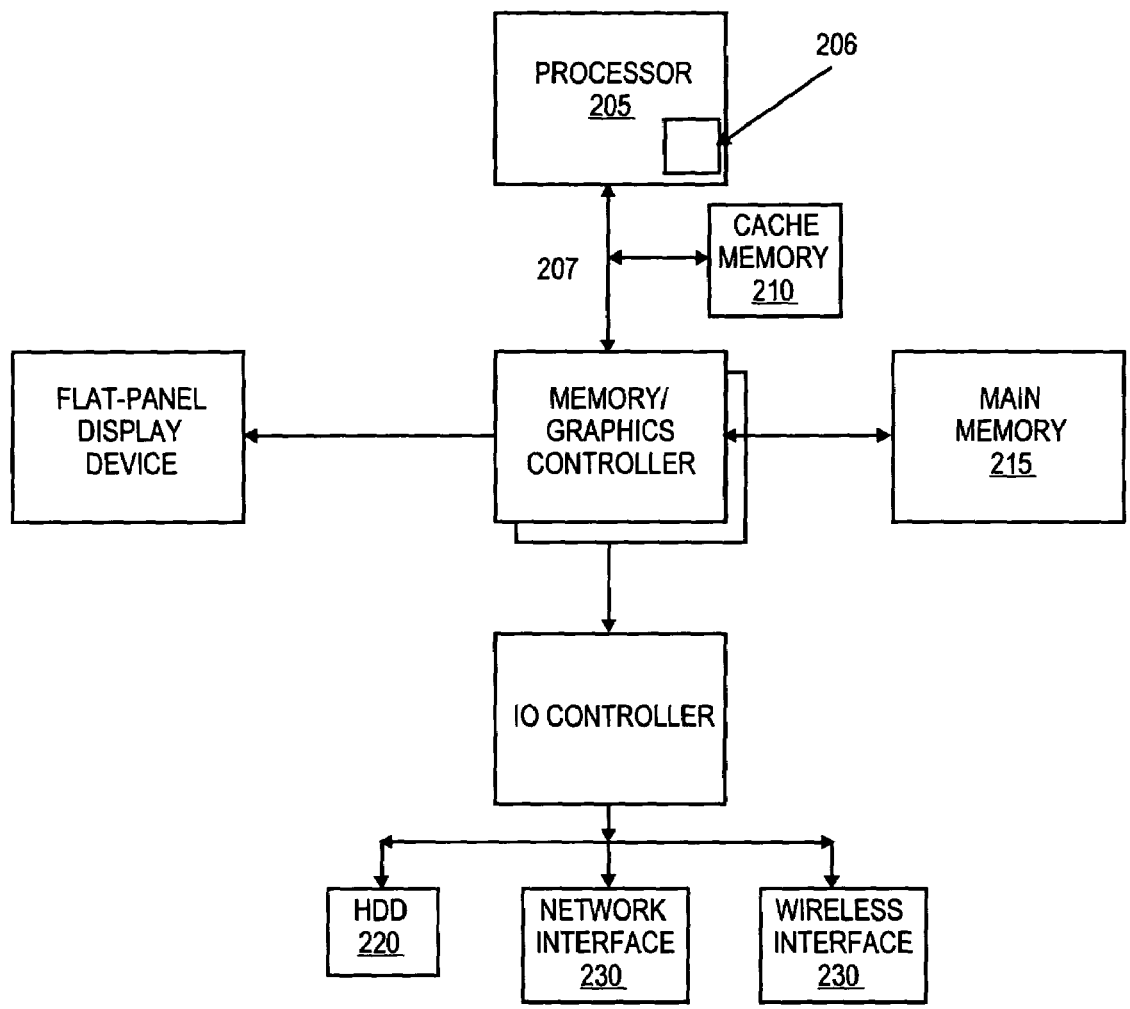
FIG. 2 illustrates a shared bus computer system in which at least one embodiment of the invention may be used.

FIG. 2 illustrates a shared bus computer system in which at least one embodiment of the invention may be used. The shared bus computer system of FIG. 2 contains a processor 205, a level one (L1) cache memory 210, and main memory 215. In other embodiments of the invention, the cache memory may be a level two (L2) cache or other memory within a computer system memory hierarchy. The processor and cache reside on the shared bus 207. Also illustrated within the processor of FIG. 2 is one embodiment of the invention 206. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 220, or a memory source located remotely from the computer system via network interface 230 containing various storage devices and technologies. The cache memory may be located either within the processor or in close proximity to the processor, such as on the processor's local bus 207. Furthermore, the cache memory may contain relatively fast memory cells, such as a six-transistor (6T) cell, or other memory cell of approximately equal or faster access speed.

The computer system of FIG. 2 may be a point-to-point (PtP) network of bus agents, such as microprocessors, that communicate via bus signals dedicated to each agent on the PtP network. Within, or at least associated with, each bus agent is at least one embodiment of invention 206, such that store operations can be facilitated in an expeditious manner between the bus agents.

Figure 3:
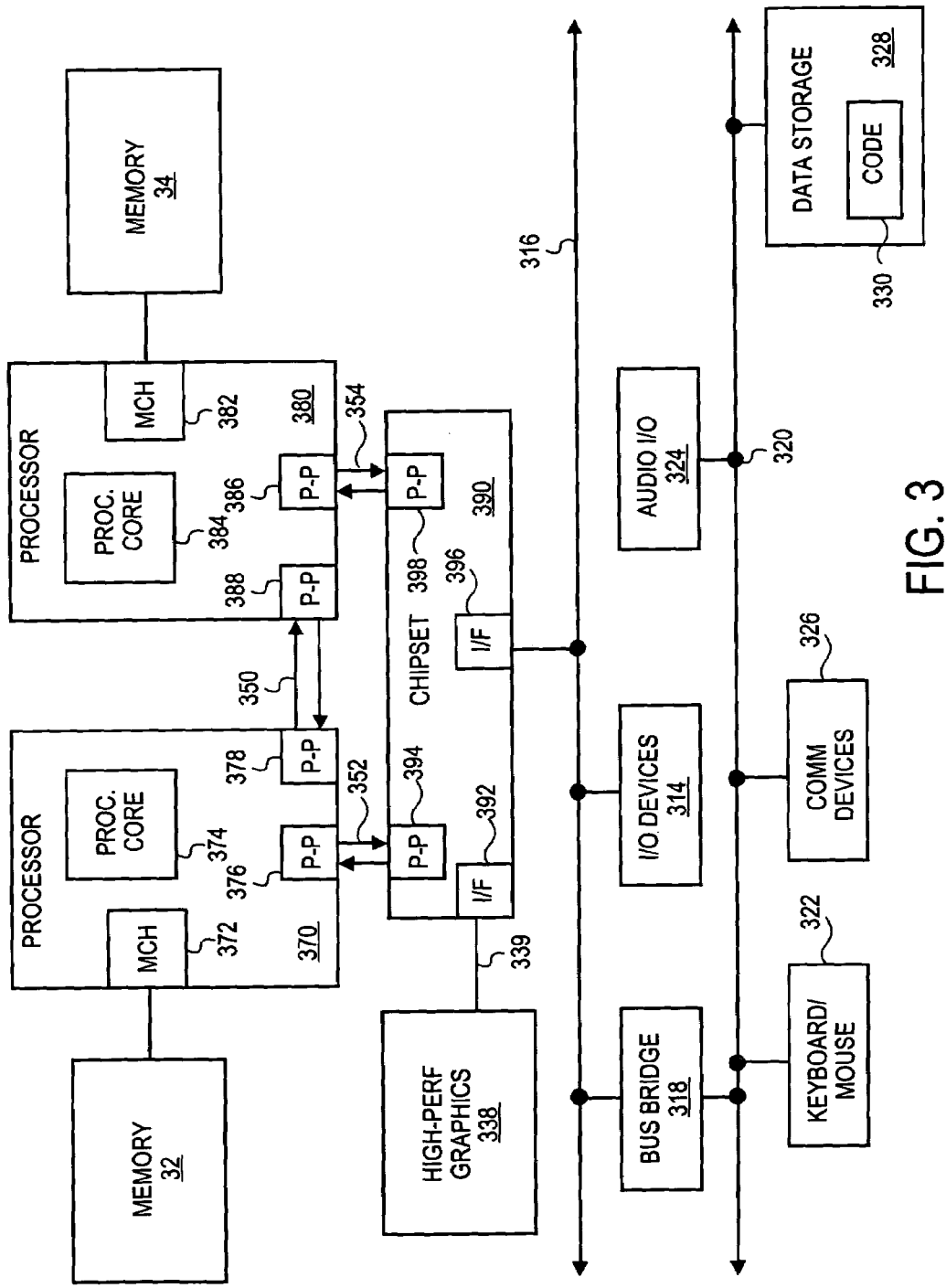
FIG. 3 illustrates a point-to-point (PtP) computer system in which at least one embodiment of the invention may be used.

FIG. 3 illustrates a computer system that is arranged in a point-to-point (PtP) configuration. In particular, FIG. 3 shows a system where processors, memory, and input/output devices are interconnected by a number of point-to-point interfaces.

The FIG. 3 system may also include several processors, of which only two, processors 370, 380 are shown for clarity. Processors 370, 380 may each include a local memory controller hub (MCH) 372, 382 to connect with memory 32, 34. Processors 370, 380 may exchange data via a point-to-point interface 350 using point-to-point interface circuits 378, 388. Processors 370, 380 may each exchange data with a chipset 390 via individual point-to-point interfaces 352, 354 using point to point interface circuits 376, 394, 386, 398. Chipset 390 may also exchange data with a high-performance graphics circuit 338 via a high-performance graphics interface 392.

At least one embodiment of the invention may be located within the processors 370, 380. Other embodiments of the invention, however, may exist in other circuits, logic units, or devices within the system of FIG. 3. Furthermore, other embodiments of the invention may be distributed throughout several circuits, logic units, or devices illustrated in FIG. 3.

Figure 4:
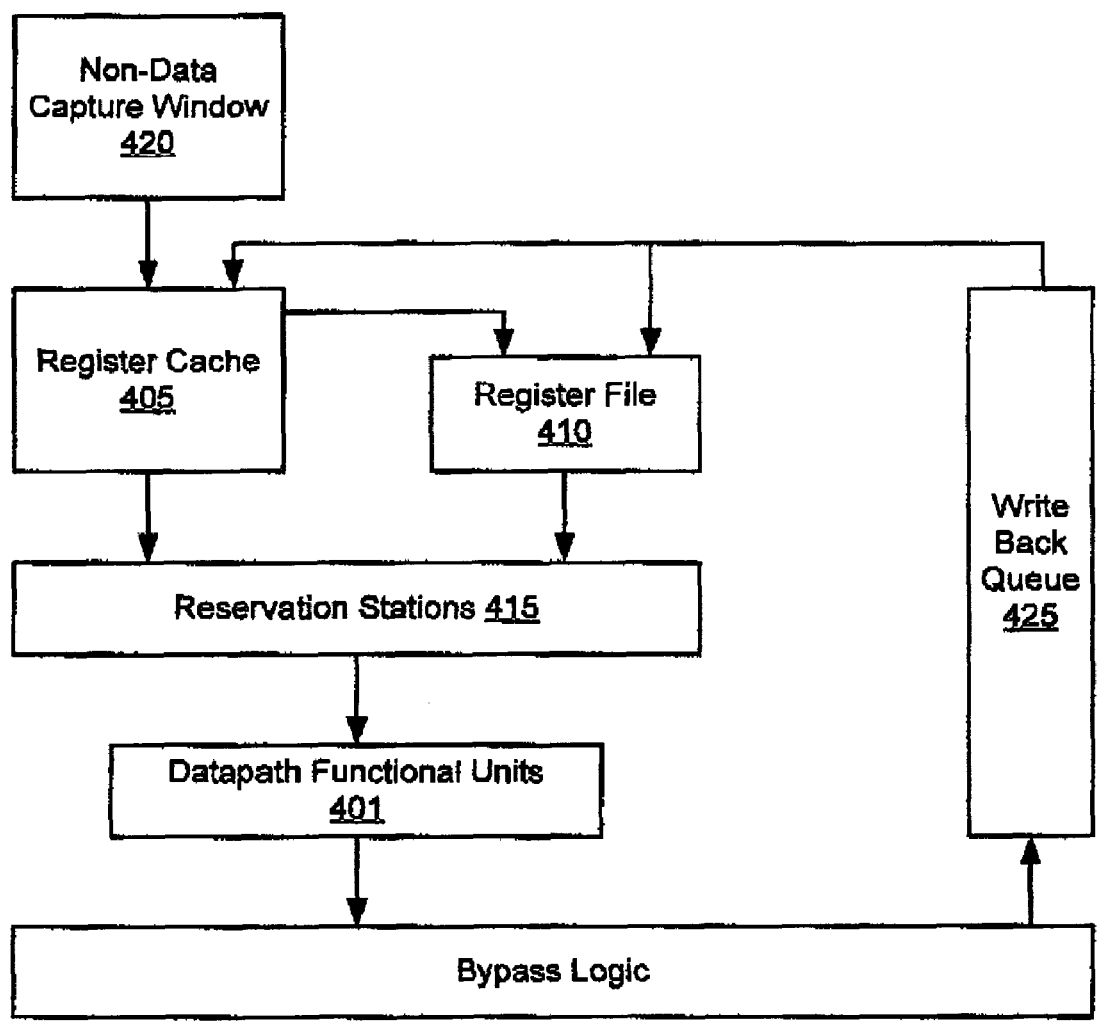
FIG. 4 illustrates a portion of a processor datapath to implement at least one embodiment of the invention, in which a register cache is used in conjunction with a writeback cache.

FIG. 4 illustrates a portion of a processor datapath to implement at least one embodiment of the invention, in which a writeback queue is used in conjunction with a register cache and register file. In FIG. 4, data to be used by the datapath functional units 401, which include execution units, can be accessed from either the register cache 405, or the register file 410 and stored in the reservation stations 415, before being used by the functional units. In some instances, data may be accessed from the register cache instead of the register file, such as when the data is not yet stored in the register file but is available in the register cache. Accessing data from the register cache, in general, is faster than accessing the same data from the register file, due to the register cache being smaller than the register file.

Micro-operations (uops) included in program instructions, may be dispatched in a structure, such as a non-data capture window 420. Data to be used by the uops can be stored in the register cache if register file bandwidth or space is not available, in one embodiment of the invention. The data may then be stored to the register file as space becomes available, or it may be delivered directly from the register cache to the reservation stations, where it can be used by the functional units. Typically, the data is accessed from the register cache instead of the register file, in some embodiments, when a uop being performed by the functional units requires the data before the data has been stored from the register cache to the register file.

As the functional units perform operations prescribed by the uops being executed, data resulting from those operations may be stored back to the register file or the register cache via a writeback queue 425, in at least one embodiment. The writeback queue, in one embodiment is a first-in-first-out (FIFO) buffer to which the data can be stored relatively quickly. The writeback queue serves as a temporary storage area before the data is stored back into the register file or register cache. Resultant data can be stored back to the register file via the writeback queue.

In one embodiment, if storage space or bandwidth is not available in the register file, due to lack of available register file ports, for example, the data can be stored to the smaller register cache until space/bandwidth is available in the register file. Furthermore, the data can be provided directly to the functional units from the register cache if the data is needed before the data can be stored back to the register file. If bandwidth/space is unavailable in the register file and in the register cache, the processor may stall. However, because the register cache can be used to store the data when space/bandwidth is unavailable in the register file, thereby acting as an "overflow" write cache, fewer processor stalls may be incurred than in the prior art.

Furthermore, in another embodiment, the data is never returned to the register file from the register cache if, for example, the data is invalidated before the data can be written to the register file. This may prevent excess write cycles to the register cache, thereby saving processing resources.

In order to prevent data written back to the register cache from being overwritten by subsequent writeback data, a locking mechanism may be used in each or some of the storage entries of the register cache. In one embodiment, the locking mechanism may be a bit or group of bits associated with particular register cache entries to indicate that the particular data element is not to be overwritten. In other embodiments, the locked register cache entries can be stored in a table that can be referenced before making an access to the register cache to determine if the target entry is locked. Other locking mechanisms may be used in other embodiments.

Figure 5:
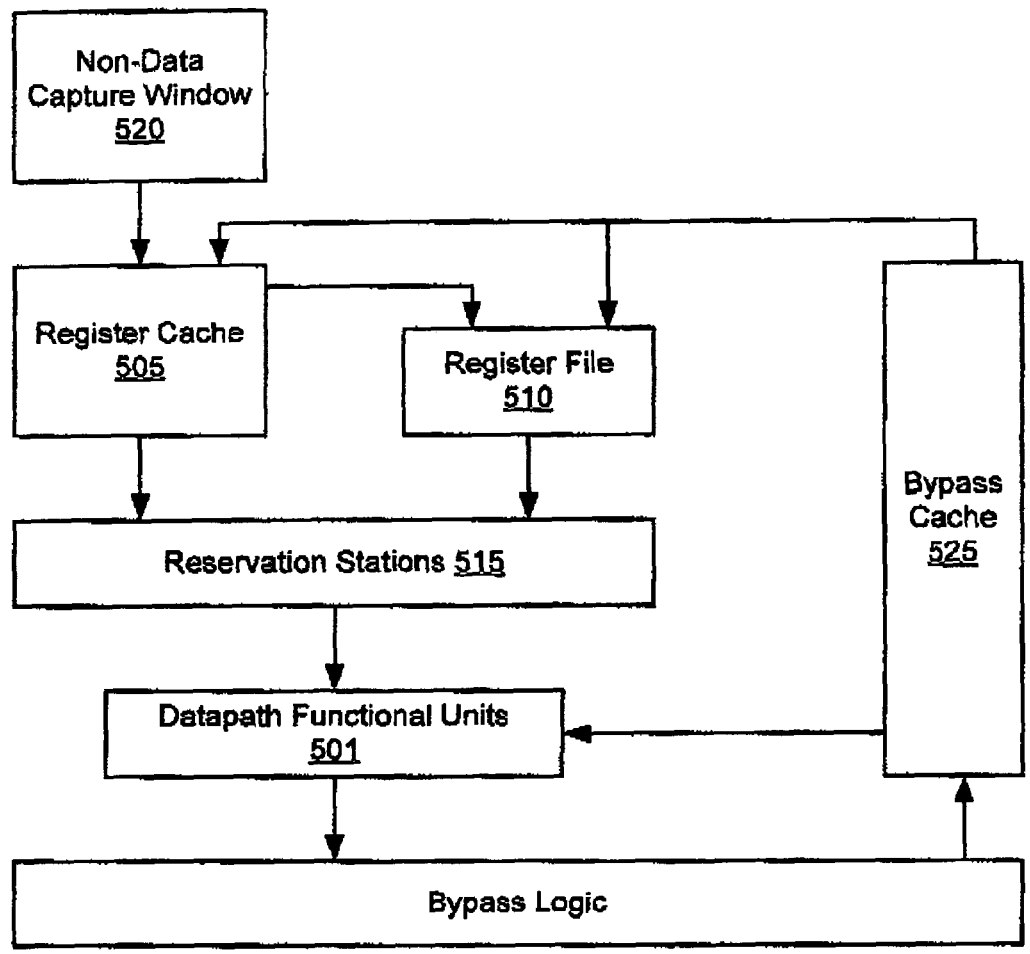
FIG. 5 illustrates a portion of a processor datapath to implement at least one embodiment of the invention, in which a register cache is used in conjunction with a bypass cache.

FIG. 5 illustrates a portion of a processor datapath, in which a bypass cache is used in conjunction with the register cache and register file. In the embodiment of FIG. 5, the writeback queue has been replaced with a bypass cache 525. However, the other elements and their operation are substantially the same as the embodiment of FIG. 4. The bypass cache serves as temporary storage for data to be written back to the functional units 501. Instead of delivering data back to the functional units, the bypass cache of FIG. 5 can write the data to the register file 510 or, if there is no available space/bandwidth at the register file, the register cache 505. If write ports and entries are available in the register cache, writing the writeback data to the register cache from the functional units rather than waiting on available space/bandwidth in the register file can increase datapath throughput and processor performance. Similar to the datapath of FIG. 4, entries within the register cache can be locked, using lock bits in one embodiment, to prevent the data stored from the bypass cache to the register cache from being overwritten by other data to be used by uops captured by the non-data capture window 520.

Figure 6:
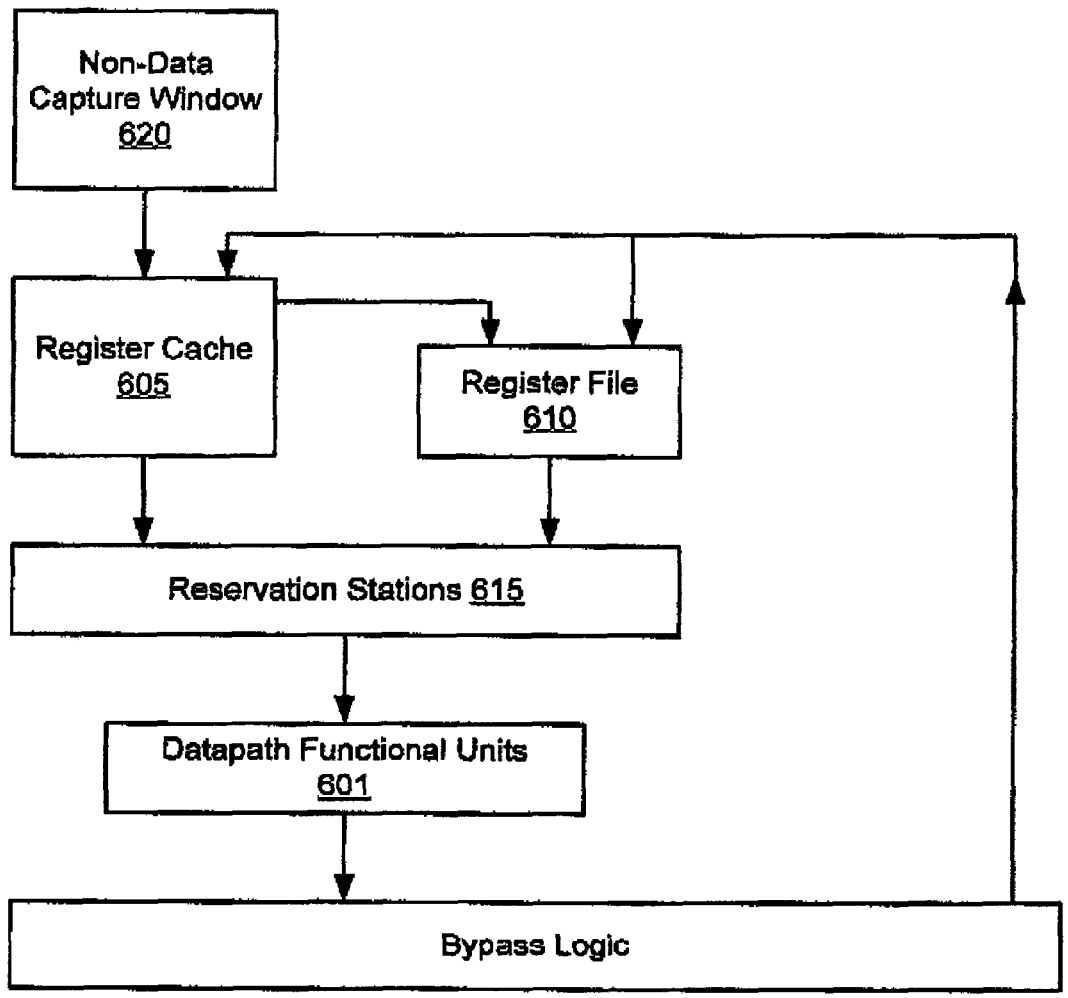
FIG. 6 illustrates a portion of a processor datapath to implement at least one embodiment of the invention, in which a register cache is used in lieu of a bypass queue or a writeback queue.

FIG. 6 illustrates a portion of a processor datapath, according to one embodiment, in which there is no bypass cache or writeback queue used in conjunction with the register cache. In the embodiment illustrated in FIG. 6, data to be written from the functional units 601 to the register file 610 or the register cache 605 are written directly from the bypass unit 607. The decision of whether to store the data within the register cache or the register file is based on criteria similar to that of FIGS. 4 and 5. Furthermore, entries within the register cache can be locked, using lock bits in one embodiment, to prevent the data stored from the bypass cache to the register cache from being overwritten by other data to be used by uops captured by the non-data capture window 620.

Figure 7:
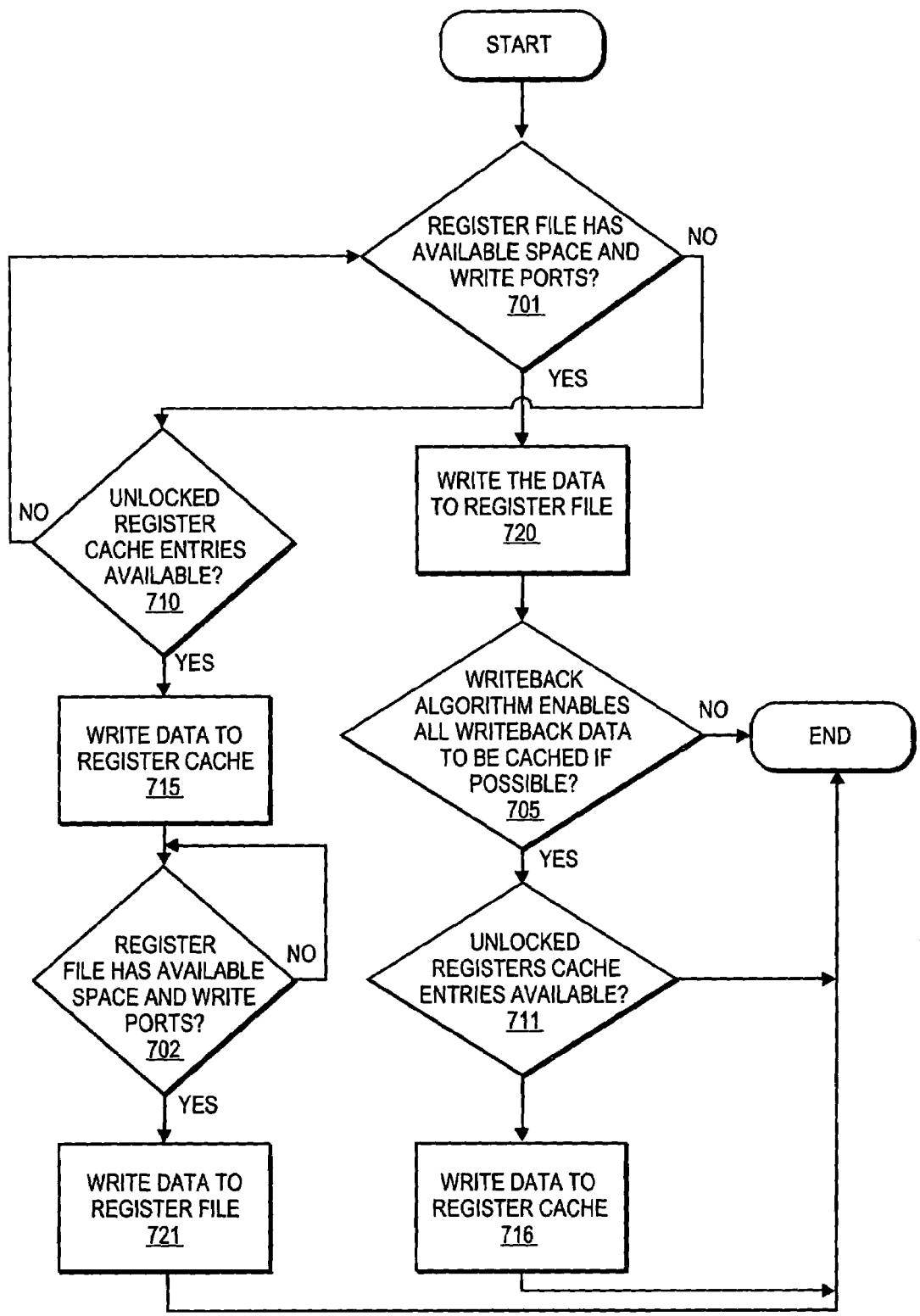
FIG. 7 is a flow diagram illustrating decision criteria upon which to base the choice of location of a data writeback operation according to one embodiment.

FIG. 7 is a flow diagram illustrating a decision criteria to determine whether to store write data to a register file or register cache, according to one embodiment of the invention. For example, in FIG. 7, if at operation 701 there there is no space in the register file or no available write ports, an attempt is made at operation 710 to write the data to the register cache. However, if there are no unlocked entries in the register cache, another attempt is made to write the data to the register file at operation 701. If there are no unlocked available entries in the register cache and there are no available write ports or space in the register file, the embodiment may stall. Furthermore, in some embodiments, operations 701 and 710 may occur in parallel.

However, if there are available register cache entries available at operation 710, the data is written to the register cache at operation 715. Furthermore, even if the data is written to the register cache at operation 715, an attempt is made to write the data to the register file at operation 702. If no write ports or space is available in the register file at operation 702, the embodiment will write the data to the register file when there is an available write port and space in the register cache, but the embodiment will not stall.

If the register cache has available space and write ports, at operation 701, the data is written to the register file at operation 720. In addition, if the register cache writeback algorithm dictates that all data must be written to the register cache, at operation 705, then if there is available unlocked entries in the register cache, at operation 711, the data is written to the register cache at operation 716. However, if no unlocked entries are available in the register cache at operation 711, the data will not be written to the register cache.

The location of where the data is written in the register cache, in some embodiments, may depend upon the location within the register cache of a least-recently used entry. In such an embodiment, the data to be written to the register cache would replace the data that is least-recently used. However, in other embodiments, other criteria for where the data is written in the register cache may be used.

Figure 8:
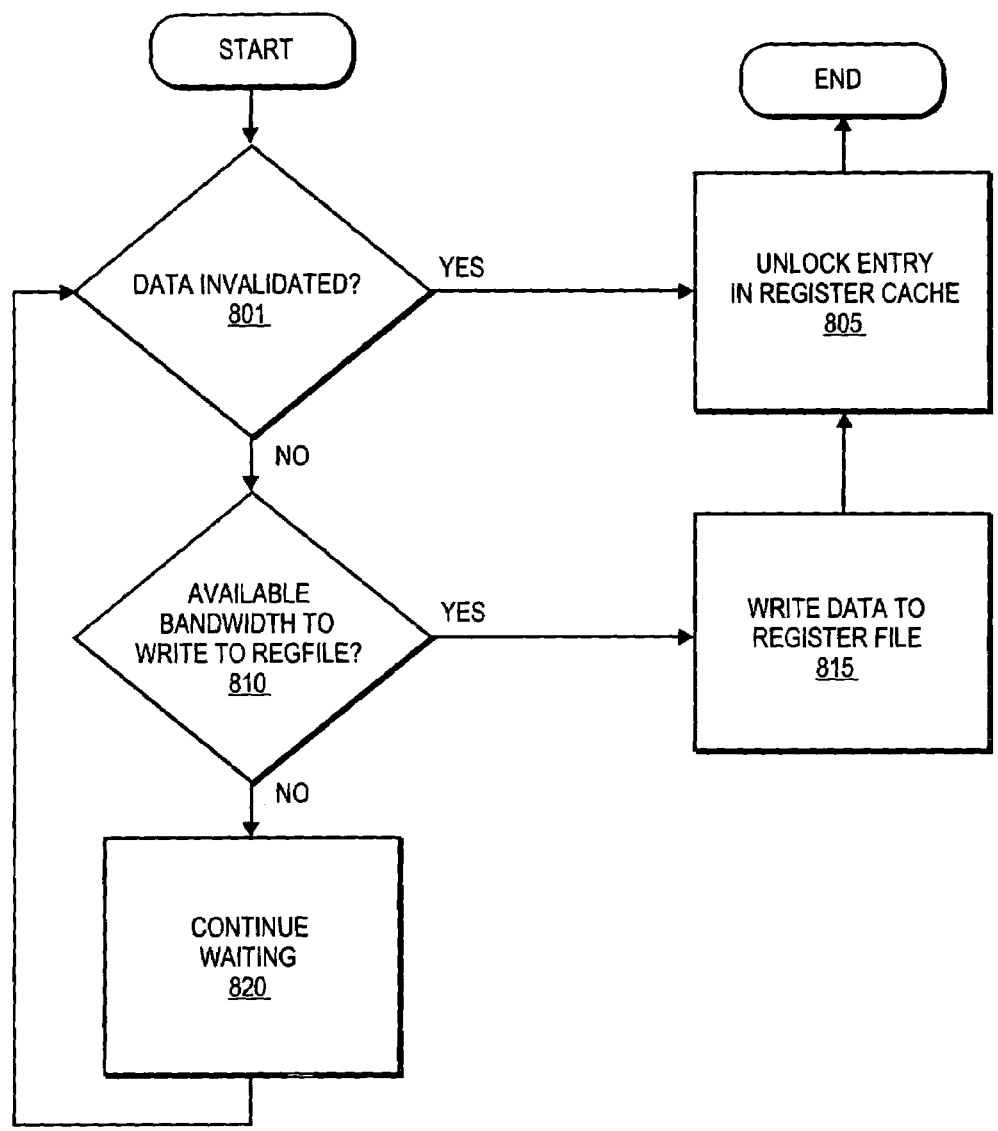
FIG. 8 is a flow diagram illustrating alternative decision criteria upon which to base the choice of location of a data writeback operation according to one embodiment.

FIG. 7 illustrates one technique for implementing certain aspects of at least one embodiment of the invention. FIG. 8, for example, illustrates another embodiment in which the data has become invalid before being written to the register file. At operation 801, if the data stored in the register cache has become invalid prior to the data being written to the register file, the data in the register cache is unlocked, at operation 805, and may be over-written by subsequent data. However, if the data has not been invalidated before the data is written to the register file, and if there is available bandwidth and space to write to the register file at operation 810, the data is written to the register file at operation 815. Otherwise, if the data has not been invalidated prior to being written to the register file, but there is insufficient bandwidth or space in the register file, the embodiment will wait, at operation 820, until there is sufficient bandwidth and space in the register file before writing the data to the register file.

While various embodiments of the invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus the invention should not be limited by any of the above described exemplary embodiments, but should be defined only in accordance with the following claims and their equivalents.

What is claimed is:

1. An apparatus comprising:
   a processing functional unit;
   a register file to provide data to the processing functional unit;
   a register cache to store data from the functional unit if no space or write ports are available in the register file.

2. The apparatus of claim 1 wherein the register cache includes lock bits to prevent data written by the processing functional unit from being overwritten.

3. The apparatus of claim 2 further comprising a non-data capture window in which micro-operations (uops) are to be captured for execution by the processing functional unit.

4. The apparatus of claim 3 wherein the register cache is smaller in size than the register file.

5. The apparatus of claim 3 further comprising a reservation station to store data before it is used by the processing functional unit.

6. The apparatus of claim 3 further comprising a writeback queue to store data written from the processing functional unit for a period of time before the data is written to the register file or the register cache.

7. The apparatus of claim 3 further comprising a bypass cache to store data written from the processing functional unit for a period of time before the data is written to the register cache or register file.

8. A system comprising:
   a memory to store an instruction;
   a register file to store data associated with the instruction;
   a processor comprising functional units to perform operations prescribed within the instruction;
   a register cache to store data from the functional units if the data cannot be stored in the register file.

9. The system of claim 8 wherein data stored in the register cache can be accessed faster than data stored in the register file.

10. The system of claim 8 comprising a locking mechanism to prevent data written to the register cache from the functional units from being overwritten.

11. The system of claim 10 wherein the locking mechanism comprises a bit to indicate that a particular entry of the register cache from being overwritten.

12. The system of claim 9 further comprising a writeback queue to temporarily store data to be written from the functional units to the register file.

13. The system of claim 12 wherein the functional units comprise an execution to execute micro-operations (uops) associated with the instruction.

14. The system of claim 13 wherein the processor further comprises arithmetic units to perform arithmetic required by the uops.

15. The system of claim 9 wherein the processor comprises a bypass cache to temporarily store data written from the functional units to the register cache.

16. The system of claim 15 wherein the register file is to store data written from or read by the functional units.

17. A method comprising:
   determining whether data from at least one processing functional unit can be stored in a register file;
   storing the data in a register cache if the data cannot be stored in the register file, wherein the data is stored in the register cache until the data is needed by the processing functional units or the data can be stored in the register file, which ever occurs first.

18. The method of claim 17 wherein the data is stored in the register cache in an entry corresponding to the least-recently used data stored in the register cache that is unlocked.

19. The method of claim 18 wherein after the data is stored in the register cache, it is locked such that the data cannot be overwritten until it is unlocked.

20. The method of claim 19 wherein if the data cannot be stored in the register file or the register cache, the data is stored in a writeback queue until the data can be stored in either the register file or the register cache.

21. The method of claim 19 wherein if the data cannot be stored in the register file or the register cache, the data is stored in a bypass cache until the data can be stored in either the register file or the register cache.

22. The method of claim 17 wherein the data is never stored in the register file if the data is invalidated before the data is stored in the register file.

23. The method of claim 22 wherein the at least one processing functional unit is an execution unit.

24. The method of claim 23 wherein the data may not be able to be stored in the register file due to lack of available write ports or space within the register file.

25. The method of claim 24 wherein the register file is larger than the register cache.

* * * * *